(12) United States Patent
Andersson et al.

(10) Patent No.: US 7,638,742 B2
(45) Date of Patent: Dec. 29, 2009

(54) METHOD AND AN APPARATUS FOR RETROSEALING OF PACKAGING CONTAINERS USING INDUCTION HEATING

(75) Inventors: Håkan Andersson, Veberöd (SE); Dag Svärd, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 13 days.

(21) Appl. No.: 11/631,695

(22) PCT Filed: Apr. 29, 2005

(86) PCT No.: PCT/SE2005/000622

§ 371 (c)(1),
(2), (4) Date: Jan. 5, 2007

(87) PCT Pub. No.: WO2006/006900

PCT Pub. Date: Jan. 19, 2006

(65) Prior Publication Data

US 2008/0067168 A1 Mar. 20, 2008

(30) Foreign Application Priority Data

Jul. 8, 2004 (SE) .................................. 0401824

(51) Int. Cl.
*H05B 6/10* (2006.01)

(52) U.S. Cl. .................................. 219/633; 156/272.4

(58) Field of Classification Search ......... 219/633–635, 219/672–676; 156/69, 272.4, 272.2, 380.2, 156/379.6; 53/477–479

See application file for complete search history.

(56) References Cited

U.S. PATENT DOCUMENTS

| | | | |
|---|---|---|---|
| 3,632,943 A | * | 1/1972 | Engler et al. ................. 219/633 |
| 3,652,361 A | * | 3/1972 | Leatherman .............. 156/272.4 |
| 3,923,585 A | | 12/1975 | Vouillemin |
| 5,013,878 A | | 5/1991 | Fries, Jr. |
| 5,889,263 A | | 3/1999 | Andersson |

FOREIGN PATENT DOCUMENTS

| | | |
|---|---|---|
| EP | 0 480 405 A1 | 4/1992 |
| JP | 61-120519 | 7/1986 |
| SE | 502 829 C2 | 1/1996 |
| WO | WO 2004/054786 A1 | 7/2004 |

* cited by examiner

*Primary Examiner*—Quang T Van
(74) *Attorney, Agent, or Firm*—Buchanan Ingersoll & Rooney PC (57) ABSTRACT

The present invention relates to a method and an apparatus for retrosealing, by means of induction sealing, an intersection zone (12) between two overlap joints (6, 11) in an at least partly formed packaging container (1) comprising a first and a second packaging part (2, 3). The first packaging part (2) is tubular and produced from a sheet of thermoplastically coated packaging material comprising at least one layer of an induction heatable material. The second packaging part (3) is sealed to the first end of the first packaging part (2).

20 Claims, 5 Drawing Sheets

METHOD AND AN APPARATUS FOR RETROSEALING OF PACKAGING CONTAINERS USING INDUCTION HEATING

TECHNICAL FIELD

The present invention relates to a method and an apparatus for retrosealing, by means of induction sealing, an intersection zone between two overlap joints in at least partly formed packaging containers, comprising a first and a second packaging part.

BACKGROUND ART

Various techniques are known in the art for sealing joints in the manufacture of packaging containers. In those cases where the packaging material includes a conductive layer, for example aluminium foil, and a heat fusing medium, for example, a thermoplastic layer, induction heat sealing may be employed for sealing a joint.

U.S. Pat. No. 5,889,263 describes, for example, an apparatus for induction sealing of a packaging material which includes a layer of aluminium foil. The apparatus comprises an inductor with two parallel conductors interconnected by two transverse conductors. The parallel conductors are disposed in an electrically insulated carrier portion. The transverse conductors are disposed in the upper surface of the inductor and coincide with the outer edges of a flat-laid tube of packaging material. The inductor is enclosed in a sealing jaw which is disposed to urge a double layer of the packaging material against a counter jaw. The parallel conductors are connected to a current source, an induction current being generated in the layer of aluminium foil. Heat is generated and each one of the conductors forms a seal of the packaging material. Between these two seals, the packaging material can be cut. With the aid of this apparatus, a seal for each one of two packages may thus be formed at the same time. The apparatus is restricted to the sealing of joints between mutually united and compressed layers of the packaging material, i.e. for transverse sealing of a flat-laid tube of packaging material.

WO2003SE01793 describes another type of packaging container where induction thermosealing is employed. This packaging container consists of a first and second packaging part which are sealed to one another. The first part is tubular and has been manufactured from a sheet of thermoplastically coated packaging material which includes at least one layer of aluminium foil. The sheet has a sealed first overlap joint between two mutually opposing edge sections of the sheet. The second part, which consists of a plastic top with an opening arrangement, is sealed to the first part by means of a second overlap joint. At one point in the packaging container, the two overlap seals intersect one another.

Further developments of this latter described packaging container have proved that it may be further improved.

SUMMARY OF THE INVENTION

One object of the present invention is to realise a retroseal which effectively reinforces the seal between the first and the second packaging part in an area at the intersection between the first and the second overlap joint, but which at the same time does not risk damaging the outside or inside of the packaging container.

This object has been attained by means of a method of retrosealing, by means of induction sealing, an at least partly formed packaging container which comprises a tubular first packaging part of a sheet of thermoplastically coated packaging material including at least one layer of an induction heatable material, the first packaging part having a first portion consisting of an edge section and a second portion consisting of an edge section, a sealed first overlap joint being formed between two said edge sections, the packaging container also including a second packaging part which is sealed to the first end of the first packaging part in a second overlap joint, the first and the second joints intersecting one another, there being formed, at the intersection between the first and the second joint, an intersection zone and the method further comprising the steps of retrosealing at least said intersection zone by providing at least one induction heating device comprising at least one conductor, disposing the induction heating device at least against the intersection zone, inducing a current in the layer of induction heatable material and conducting a sufficiently great proportion of said induced current via that portion of the first packaging part whose edge section abuts against the second packaging part in order that retrosealing takes place between the first and second packaging parts at least in the intersection zone and for ensuring that the outside as well as the inside of the packaging container are not damaged by the retrosealing. In induction sealing, most current is induced in the layer with induction heatable material placed most proximal the inductor. If a conventional inductor were to be disposed over the intersection zone, the current density would be at its greatest in that portion of the first packaging part which is placed most proximal the inductor. Only a very slight proportion of the induced current would be conducted in to the seal between the first and the second packaging parts. In order to achieve sufficient sealing heat between the first and the second packaging parts, it would be necessary to increase the current strength which would have as a consequence that the surface layer on the outside of the packaging container would be burnt. Similarly, there would be a risk of damaging the surface layer of the inside of the packaging container in that area of the first packaging part which is located around the intersection zone, since heat generation there would be excessive. In the present invention, this problem is solved by instead conducting in as much as possible of the induced current via that portion of the first packaging part whose edge section abuts against the second packaging part. By such means, heat generation would be obtained in those parts of the packaging container where the heat is desirable and but slight heat generation where it is not desired, i.e. where, for example, it would cause damage to decorative artwork or the inside layer, and so on.

In one preferred embodiment of the present invention the step of providing the induction heating device includes disposing the greater part of the conductor against that portion of the first packaging part whose edge section abuts against the second packaging part. Generally, current chooses the path of least resistance and, by disposing the conductor against that portion in which the current is desirable, the greater part of the current will also remain in that portion.

According to a second preferred embodiment, the method includes the step of applying a counter abutment cooperating against the induction heating device and thereby realising a pressure loading on the intersection zone during retrosealing thereof. By such means, a sealing pressure may readily be applied.

According to a further preferred embodiment, the step of providing the induction heating device includes disposing said conductor against the outside of the first packaging part and applying the counter abutment against the inside of at least the first packaging part. Being able to carry out the retrosealing from the outside of the packaging container facilitates production of the packaging container, since the packaging container may be disposed on an arm, a so-called mandrel, in a mandrel wheel which rotates its arms between different forming and sealing stations. The counter abutment requires no current transmission and can be integrated in the arm in a simple manner.

The present invention also relates to an apparatus in the form of an induction device for retrosealing, by means of induction sealing, an at least partly formed packaging container, the packaging container comprising a tubular first packaging part of a sheet of thermoplastically coated packaging material including at least one layer of an induction heatable material, the first packaging part having a first portion including an edge section and a second portion including an edge section, a sealed first overlap joint being formed between two said edge sections, the packaging container also including a second packaging part which is sealed to a first end of the first packaging part in a second overlap joint, the first and second joints intersecting one another, there being formed an intersection zone at the intersection between the first and the second joints, the induction heating device including at least one conductor, the induction heating device being adapted for abutment against at least the intersection zone and being adapted to induce a current in the layer of induction heatable material, and said conductor being designed to conduct a sufficiently great proportion of said induced current via that portion of the first packaging part whose edge section abuts against the second packaging part in order that retrosealing take place between the first and second packaging part at least in the intersection zone and in order to ensure that the outside as well as the inside of the packaging container are not damaged by the retrosealing. On induction sealing, as was previously mentioned most current is induced in the layer with induction heatable material placed most proximal the inductor. If a conventional inductor were to be disposed over the intersection zone, the current density would be at its greatest in that portion of the first packaging part which is placed most proximal the inductor. A very slight proportion of the induced current would be conducted in to the seal between the first and the second packaging parts. In order to achieve sufficient sealing heat between the first and the second packaging parts, it would be necessary to increase the current strength which would have as a consequence that the surface layer on the outside of the packaging container would be burnt. Similarly, there would be a risk of damage in the surface layer on the inside of the packaging container in that region of the first packaging part which is located around the intersection zone. According to the present invention, this problem is solved by instead realising an induction heating device which can conduct in as much as possible of the induced current via that portion of the first packaging part whose edge section abuts against the second packaging part. By such means, heat generation will be obtained in those parts of the packaging container where the heat is desirable and but slight heat generation where it is undesirable, in other words where, for example, it would cause damage to decorative artwork and so on.

In one preferred embodiment, the conductor is adapted to abut for the greater part against that portion of the first packaging part whose edge section abuts against the second packaging part. As was mentioned previously, current generally chooses the path of least resistance and, in that the conductor is adapted to be able to be applied against that portion in which the current is desirable, the greater part of the current will also remain in that portion.

In still a further preferred embodiment, said conductor is adapted to abut against the outside of the first packaging part. To be able to carry out the retrosealing on the outside of the packaging container facilitates manufacture of the packaging container, since the packaging container may be applied on an arm, a so-called mandrel, in a mandrel wheel which rotates its arms between different forming and sealing stations.

In yet a further preferred embodiment, the conductor includes a first and a second leg, each of these legs having a first and second end and the legs being, in their respective second ends, interconnected via a lug-shaped portion. The lug-shaped portion is formed so that a high current density is attained, which gives great heat generation and the lug-shaped portion is thereby employed for sealing the intersection zone while the legs are suitably designed so that a low current density is achieved and the legs are therefore employed so as to lead the induced current in the desired portion of the first packaging container.

Preferably, said legs extend a distance apart from one another and substantially parallel with one another.

It is advantageous if the first end of each leg is of substantially greater width than the width of the lug-shaped portion. By such means, the current may be concentrated in the lug-shaped portion, i.e. the current density may be increased in order to obtain such a high power output, and thereby heat generation, in the lug-shaped portion that the plastic layer melts and fuses or seals. Outside the lug-shaped portion, the intention is instead to keep the current density at such a low level that the power and heat generation does not give rise to melting of the plastic layer. This reduces the risk of damage to the inside and outside of the packaging container in those areas where no seal is to be generated. That the legs are wide in their first end is particularly important for the area in the first packaging part. In the intersection zone, the second packaging part is located and this may assist in absorbing the energy, but around the intersection zone, in particular the area in the first packaging part, the packaging material itself is to absorb all energy and then it is appropriate if the energy is low in order to reduce the risk of damage, in particular to the inside of the packaging container.

According to one preferred embodiment, each leg is curved and each respective first end is adapted to at least initially extend in a direction substantially parallel with the first overlap joint. By such means, the current is led in the desired portion "beneath" the first overlap joint.

In still a further preferred embodiment, the width of each leg reduces in a direction from the first end towards the second end. By such means, the current density is increased more proximal the sealing zone.

In yet a further embodiment, the legs are adapted, in a first conductor portion, to extend in a direction substantially parallel with the first overlap joint, and each leg, at one end of the first conductor portion, merges in a second conductor portion where the legs diverge in relation to the first conductor portion and the second conductor portion merges at one end in the lug-shaped portion.

In still a further embodiment, the legs are angled in the second conductor portion at an angle in relation to the first conductor portion.

Preferably, the width of said legs tapers in the second conductor portion in a direction towards the lug-shaped portion. By such means, the current density is increased in the lug-shaped portion.

According to one preferred embodiment, the induction heating device includes induction heating connections to a high-frequency current supply device for conducting current through the conductor, the one leg being connected to the one current connection and the second leg being connected to the second current connection so that a current which is applied to the induction heating device is adapted to be conducted in one direction in the first leg and an opposing direction in the second leg. By such means, a closed current circuit is readily achieved.

In still a further preferred embodiment, there is disposed, between said legs, an inlay of a powerfully magnetically permeable material. The distance between the legs is slight and the function of the inlay is to concentrate the magnetic fields around each respective leg. This concentration results in the magnetic fields being separated and thereby prevented from interfering with each other. The concentration also results in a local increase in power generation in the induction heatable layer, which gives a stronger seal.

In yet a further preferred embodiment, the lug-shaped portion is adapted to be disposed at least against the intersection zone, while the legs are adapted to be disposed for the greater part against that portion of the first packaging part whose edge section abuts against the second packaging part. As was previously described, there will thus be achieved sealing heat where it is desirable while less heat is generated where it is not desirable.

In still a further preferred embodiment, the conductor includes at least one element projecting from a surface adapted towards the packaging container, the element having its longitudinal extent in a direction substantially transversely of the longitudinal direction of the first overlap joint, and the element being disposed, in the intersection zone at a transition between one and two packaging material layers at the first overlap joint, to give extra compression loading on the retrosealing. By such means, any possible risk of channel formation in the transitions between one and two material layers is readily eliminated.

BRIEF DESCRIPTION OF THE DRAWINGS

The present invention will now be described in greater detail hereinbelow, with reference to one preferred embodiment and with the aid of the accompanying Drawings. In the accompanying Drawings.

DETAILED DESCRIPTION OF THE DRAWINGS AND PREFERRED EMBODIMENT

Figure 1:
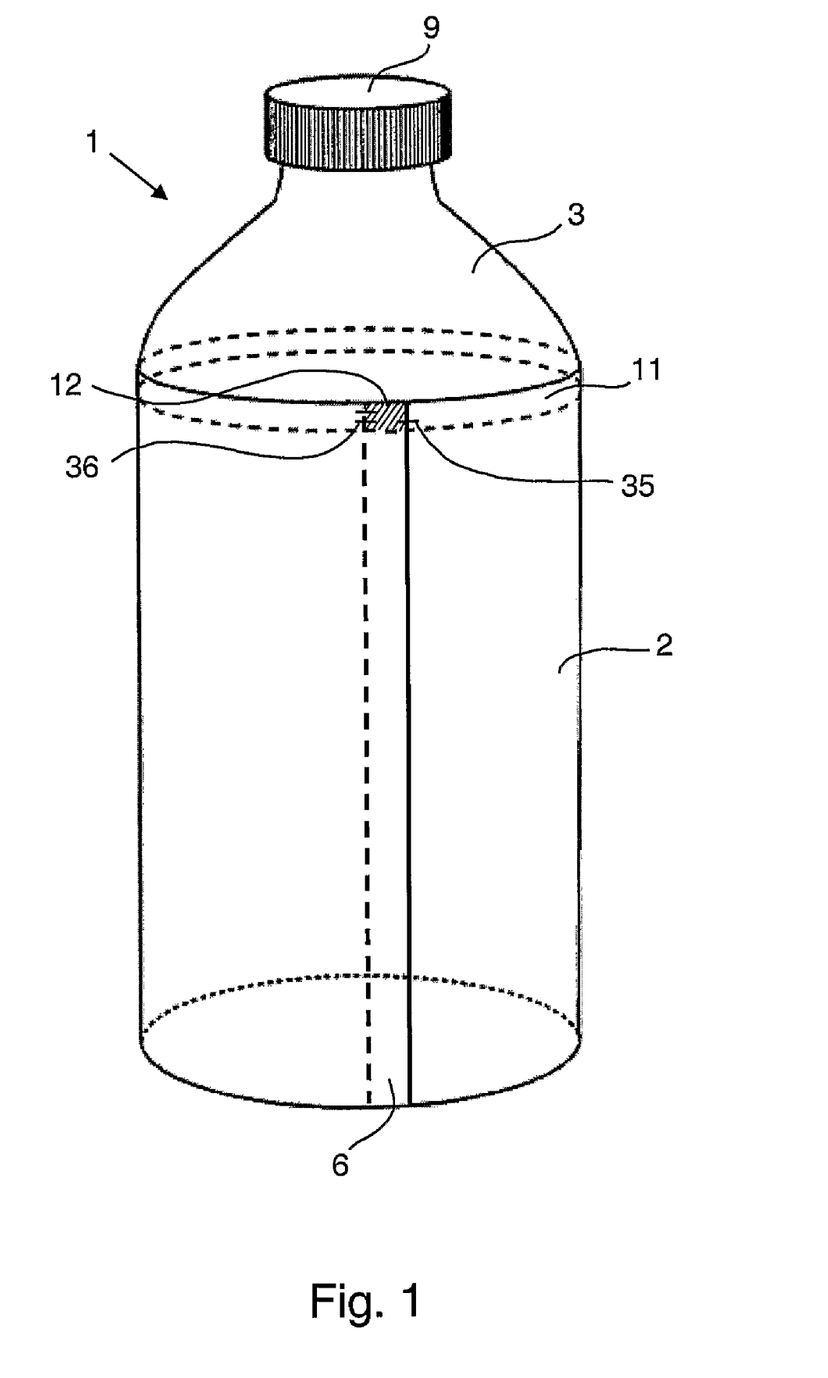
FIG. 1 schematically illustrates a packaging container from the outside comprising a first and second part and displaying two intersecting overlap joints.
Figure 2:
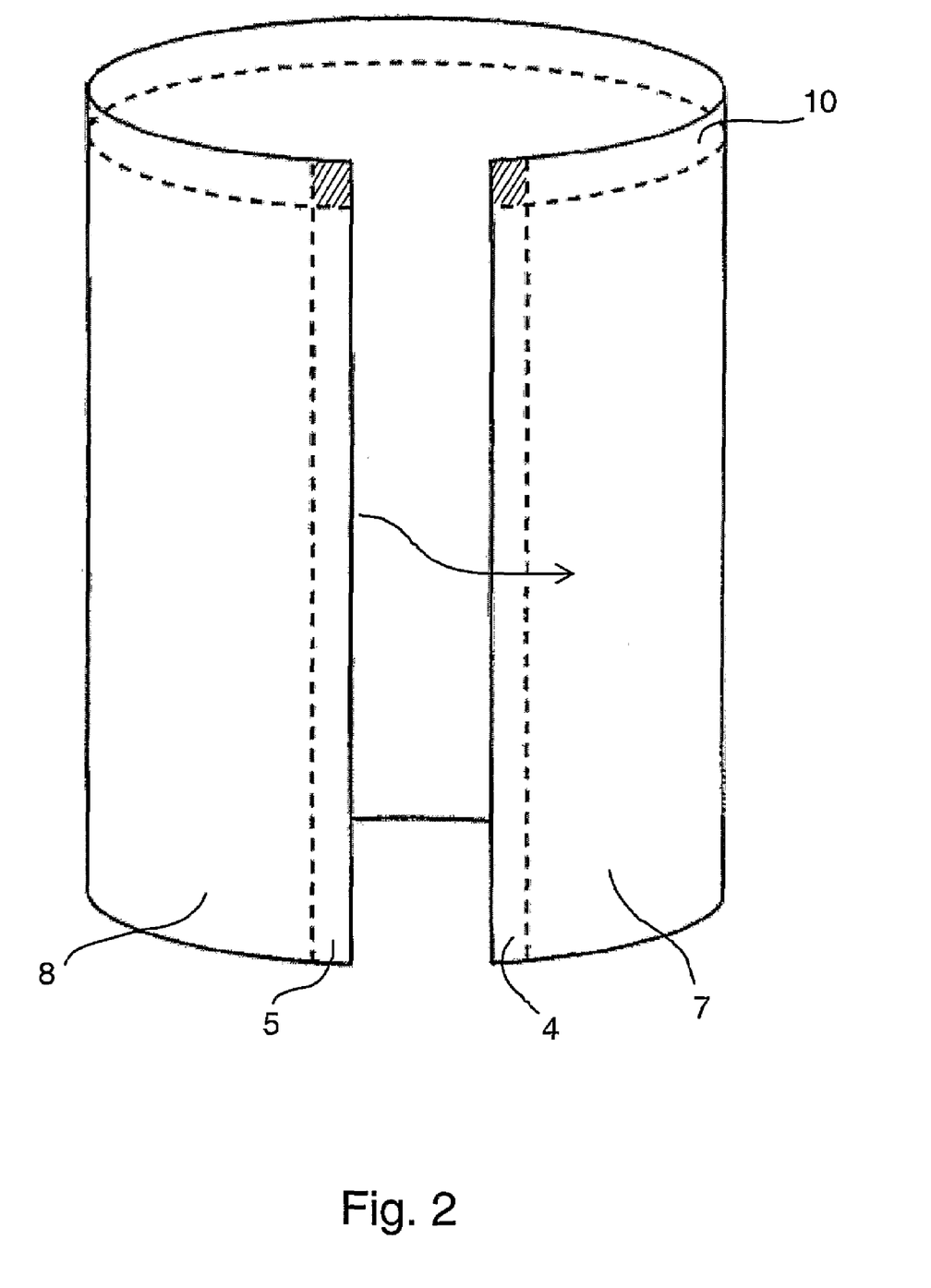
FIG. 2 schematically shows the first packaging part in an unsealed state where the edge sections and intersection zone are marked.

FIG. 1 shows an at least partly formed packaging container which has been given reference numeral 1. The partly formed packaging container 1, which will hereafter be referred to only as packaging container 1, is in the form of a bottle comprising a first packaging part 2 and a second packaging part 3. The first packaging part 2 is tubular and manufactured from a thermoplastically coated packaging material. A sheet of packaging material is employed for producing a sleeve. The sheet consists of one thermoplastic layer, one layer of an induction heatable material in the form of an electrically conductive layer which, in this case, is an aluminium foil, one layer of paperboard and another layer of thermoplastic. The thermoplastic layers may consist of, for example, polypropylene, polyethylene or polyethylene terephthalate (PET). The sheet has been folded around a forming device and formed into a tube in that a first and second edge section 4, 5 of the sheet, which are opposed to one another, have been provided with a mutual overlap. With the aid of a sealing device, the thermoplastic has been heated up in the overlapping region and a sealed first overlap joint 6 has been formed between the two said edge sections 4, 5. The first edge section 4 is included in a first portion 7 of the first part 2 and the opposing second edge section 5 included in a second portion 8 of the first part 2. This is shown in FIG. 2. For the sake of clarity, only the first packaging part 2 is shown. The first joint 6 is further shown "unsealed". The term each portion 7, 8 is taken to signify a region which includes each respective edge section 4, 5, but which is larger than the respective edge sections 4, 5. Thus, the first portion 7 extends from the outer edge of the edge section 4, i.e. the one edge of the sheet, a distance in a direction transversely of the sheet towards the opposing second outer edge of the sheet where the second edge section 5 is located. Similarly, the second portion 8 extends from the outer edge of the second edge section 5 a distance in a direction transversely of the sheet towards the opposing edge where the first edge section 4 is located.

Figure 3:
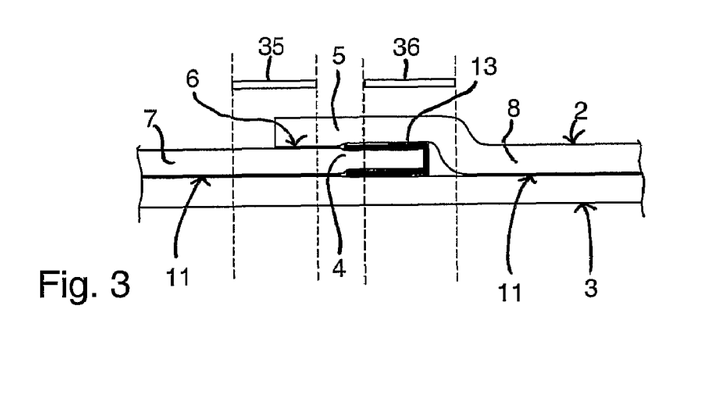
FIG. 3 schematically shows a part of a section through the first and the second overlap joints where the area just beneath the Figure is the inside of the packaging container, while the area above the Figure is the outside of the packaging container.

The incision surface of the packaging material in the first edge section 4 will be exposed to the contents of the package. Since the material includes at least one paperboard or paper layer which readily absorbs the contents, the incision surface is, in a per se known manner, covered by a strip 13. The strip 13 is liquid-tight and is normally of thermoplastic material which is advantageously thermosealed in position. The strip 13 is folded about the incision surface. It thus covers the incision surface and the folding-over is effected so that the strip extends in a direction from the incision surface inwards transversely of the longitudinal direction of the edge section to approximately half of the width of the edge section, see FIG. 3.

Figure 4:
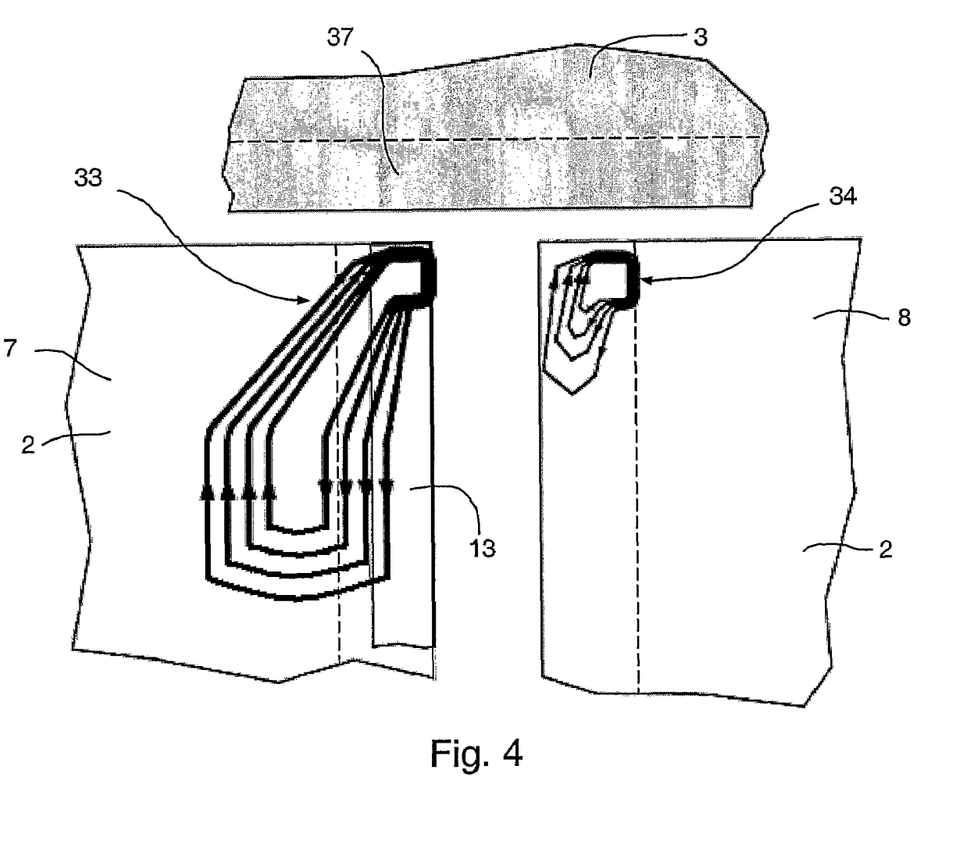
FIG. 4 schematically shows an exploded view seen from inside of the packaging container, whose purpose is to illustrate the movement of the current in the first and second portion of the first packaging part during retrosealing.

The second packaging part 3 is a plastic top provided with an opening/closing arrangement 9. It is preferably manufactured from, for example, polypropylene, polyester or polyethylene and has been produced by, for example, blow moulding or injection moulding. The second packaging part 3 may have in principle any configuration whatever, but is provided with an edge section in the form of a flange 37 for adaptation to the first packaging part 2. The flange is shown in FIG. 4. The second packaging part 3 projects out from an open end of the tubular first packaging part 2, see FIG. 1. The first packaging part 2 overlaps the second packaging part 3 and there is formed a second overlap joint 11 between the two. The edge section 10 of the sleeve which constitutes the first packaging part is thereby placed outside the edge of the plastic top. Consequently, the edge of the plastic top at the joint 11 is placed on the inside of the packaging container 1.

The first and second overlap joints, 6 and 11, thus intersect one another in an intersection zone 12. The retrosealing according to the present invention takes place at least in this intersection zone 12. A certain heating, in some cases even up to sealing temperature, however takes place also in the area around the intersection zone 12.

In order to retroseal the intersection zone 12, use is made of induction heating. The principles behind this sealing technique as applied in the present invention are to induce an electric heating current in the aluminium foil in the first packaging part 2 in order to heat up the foil and consequently also the thermoplastic layer. The heating current in the aluminium foil may be induced with the aid of a magnetic field which is created by an inducing electric high-frequency current which flows through an electrically conductive material in an induction sealing device 14 in the proximity. This induction sealing device 14 will be described hereinbelow.

Figures 5, 6, 7:
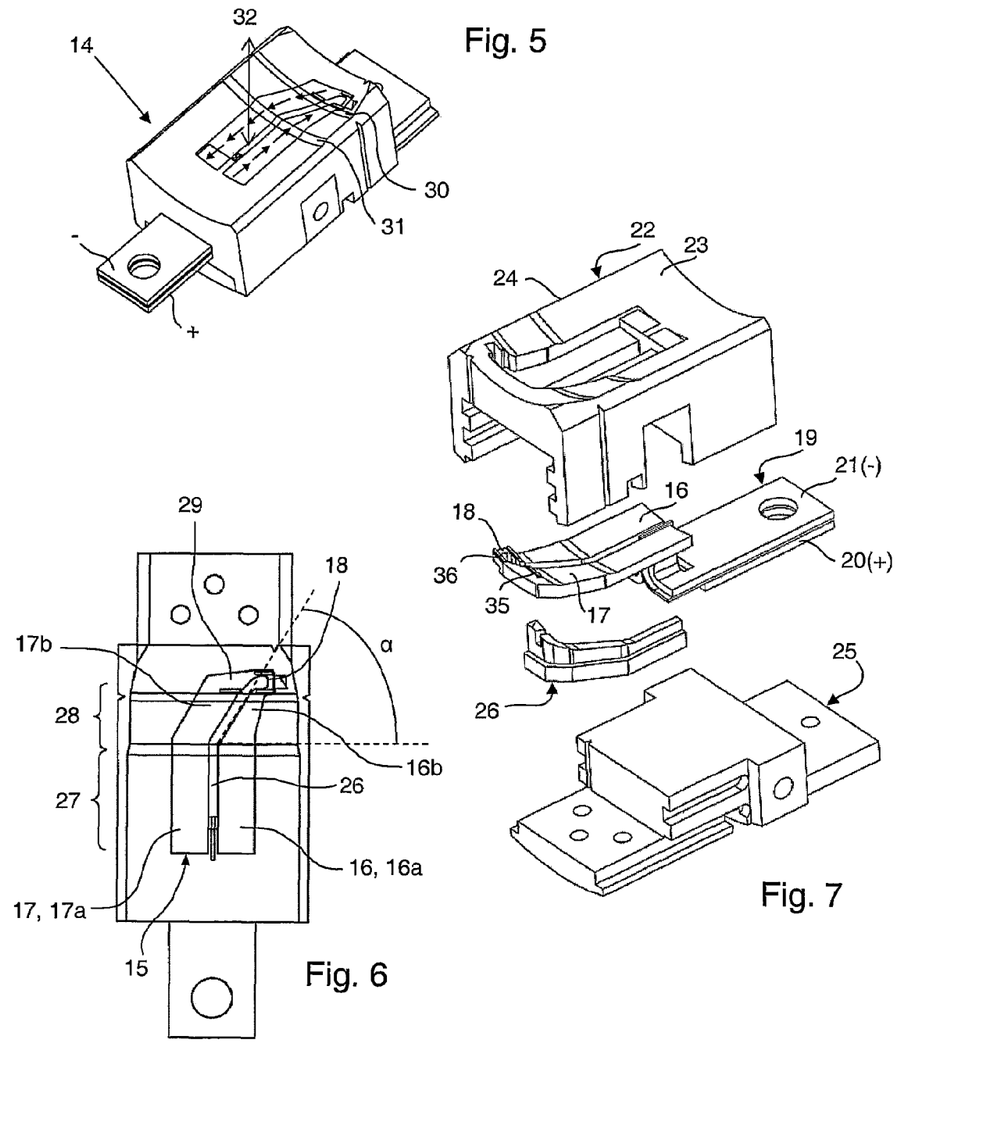
FIG. 5 schematically shows a perspective view of an induction heating device.
FIG. 6 schematically shows a top plan view of the induction heating device of FIG. 5.
FIG. 7 schematically shows an exploded view of the parts included in the induction heating device.

FIGS. 5 to 7 are views of the induction heating device 14 according to the present invention. The induction heating device 14, which is also designated inductor device below, is included in a sealing apparatus (not shown). The inductor device 14 comprises a conductor 15 which includes a first and a second leg 16, 17. The legs each have a first and a second end 16a, 17a, 16b, 17b. Each respective second end 16b, 17b are interconnected in a lug-shaped portion 18. The first ends 16a, 17a are free. The legs 16, 17 of the conductor are disposed electrically insulated from one another and extend substantially parallel with one another. FIG. 7 shows the conductor "naked". The conductor is disposed to be connected to a high-frequency current supply device (not shown) of about 0.5 MHz which is included in the sealing apparatus. In the Figure, this is indicated (even though this is a matter of alternating current) for the sake of simplicity by + and −. For coupling in the current supply device, the inductor device 14 includes an element 19 for electric coupling which is also shown "naked" in FIG. 7. It includes a positive pole terminal 20 which is disposed to be coupled to a positive pole for the current supply device and a negative pole terminal 21 which is disposed to be coupled to a negative pole for the current supply device. The positive pole terminal 20 is coupled to the second leg 17, while the negative pole terminal 21 is coupled to the first leg 16.

A current which is impressed on the positive and negative pole terminals 20 and 21 will, as is obvious int. al. from FIG. 5, be conducted in a direction in the first leg 16 as indicated by arrows, and in an opposed direction in the second leg 17, as is also indicated by arrows.

With reference to FIG. 7, the inductor device 14 further includes an insulating body 22 in which the conductor 15 and the element 19 for electric coupling are partly disposed. The body is designed with a surface 23 including a recess 24 for the conductor 15. The conductor 15 is embedded in the body 22 and has a surface which is shown from the outside of the inductor device 14 and which is disposed to be able to abut against the packaging container 1.

The inductor device 14 moreover includes a cooling element for cooling. The cooling element, designated 25, includes ducts for cooling which are disposed to lead a coolant, e.g. water, along the conductor 15 in order to cool it.

As was previously mentioned, the conductor is in the form of a first and a second leg 16, 17. With reference to FIG. 6, it may be seen that these legs, in one currently preferred embodiment, extend substantially parallel with one another and both legs 16, 17 run at a distance from one another which is substantially maintained throughout their entire extent. In a first region 27, the legs 16, 17 extend in a direction parallel with the first overlap joint 6. At the upper end of the first region 27, the legs 16, 17 continue in an angled second region 28. The legs 16, 17 are still substantially parallel in this second region 28, but deflect off at an angle α to one side of the inductor device 14. The angle lies in the range of from 0 to 90° and is preferably 60°. In the Figure, it can be seen that the legs deviate off to the right. In the angled region 28, the first leg 16 is of smaller width seen transversely of the longitudinal direction of the first overlap joint, than the width of the second leg 17. In the first region 27, the width is however substantially equal. In the angled second region 28, the width of the second leg 17 is substantially constant and substantially of equal size as the first straight region 27. In the second region 28, the width of the first leg 16 tapers from the first region 27. In the upper end of the angled second region 28, seen in the Figure, both legs 16, 17 are, as was mentioned previously, interconnected in a lug-shaped portion 18. The second leg 17 is in an upper portion of the angled region 28 seen in the Figure, provided with a bridging area 29 which tapers powerfully and deviates off towards this lug-shaped portion 18.

Figure 8:
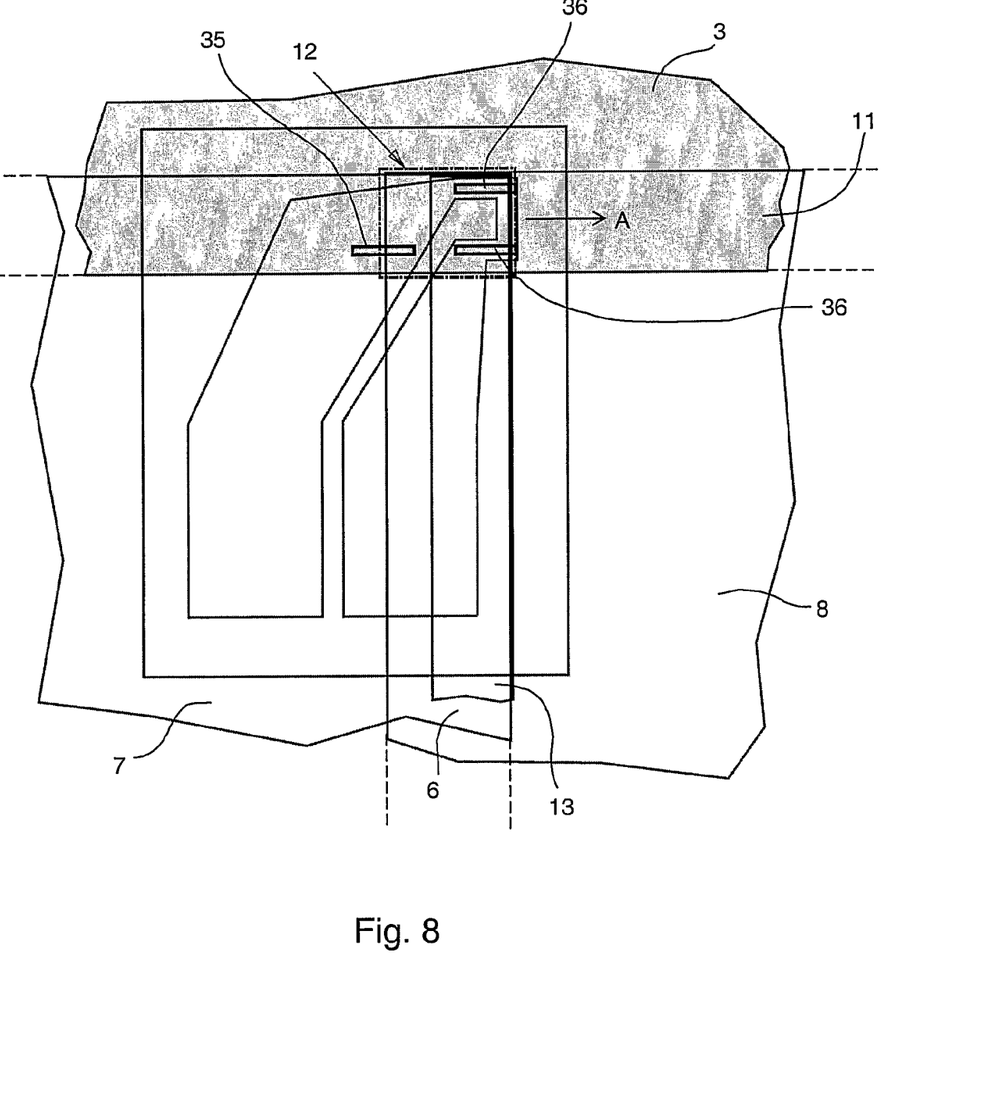
FIG. 8 schematically shows a view in cross section seen from the inside of a part of the packaging container of FIG. 1, this view illustrating the placing of the induction heating device on retrosealing.

The lug-shaped portion 18 is, in the illustrated example, dimensioned in configuration and size so that it is disposed to be able substantially to be applied within the intersection zone 12 and almost cover it. By this is meant that the intersection zone 12 and the lug-shaped portion 18 substantially correspond dimensionally and that the lug-shaped portion 18, on abutment against the packaging container 1, is disposed to substantially cover the intersection zone 12. This is shown in FIG. 8. In one alternative embodiment, the lug-shaped portion 18 may extend a slight distance out over the intersection zone at least in a direction transversely of the first overlap joint 6, i.e. the lug-shaped portion becomes more elongate in a direction transversely of the first overlap joint 6, see the arrow A in FIG. 8. In such an alternative, a larger deviation is tolerated in the mutual positioning of the inductor and the packaging container in the lateral direction seen in FIG. 8.

The width of the conductor 15 in the lug-shaped portion 18 is substantially less than the width of the rest of the legs 16, 17. The reason is that the intention is to concentrate the current in the lug-shaped portion 18, i.e. increase the current density in order to achieve such a high power development and thereby heat generation in the lug-shaped portion 18 that the plastic melts and fuses together. Outside the lug-shaped portion 18, the intention is instead to keep the current density at such a relatively low level that the power development does not give rise to any melting of the plastic. This applies particularly in the area below the intersection zone, see for example FIG. 1. Here, there is no plastic top 3 which can absorb energy, but all energy arrives in the packaging material in the first packaging part 2. This material is more sensitive and runs the risk of being damaged more easily.

In the preferred embodiment, the conductor 15 is manufactured from copper.

As was mentioned previously, both of the legs 16, 17 run at a distance from one another which is substantially maintained throughout their entire extent. This distance is slight (approximately 1 to 2 mm) and, because it is slight, the magnetic fields of each respective leg tend to interfere with one another, in which event the sealing result runs the risk of being negatively affected. In order to avoid this negative effect, a powerfully magnetically permeable material, such as, for example, Ferrotron™, is disposed between the two legs 16, 17. FIGS. 5 to 7 show a Ferrotron™ inlay 26 disposed between the two legs. The function of the Ferrotron™ inlay is to concentrate the magnetic fields around each respective leg 16, 17. This concentration results in the magnetic fields being separated and thereby prevented from interfering with one another. The concentration also results in a local increase of the power generation in the aluminium foil. The result of this measure will be a stronger seal.

The induction heating device 14 which was described above is disposed to be arranged on the outside of the packaging container 1 during the retrosealing of the intersection zone 12. The surface of the inductor device 14 which is disposed to abut against the packaging container 1 is adapted to the outer contour of the packaging container 1. This renders the surface double-curved. On the one hand, the surface has a radius which substantially corresponds to the radius of the first packaging part 2 of the packaging container. On the other hand, an upper area of the surface formed after the transition between the first and the second packaging parts, i.e. the configurational change which is displayed at the second overlap joint 11 and the area above seen in a direction along the first overlap joint 6. No detailed description of the curvature of the surface of the inductor in the illustrated example will be described, and in the event that the configuration of the packaging container in FIG. 1 is compared with the inductor in FIGS. 5 to 7, it should be observed that these do not entirely agree. It should, however, be noted that it is desirable to obtain a satisfactory sealing pressure in and around the intersection zone 12, i.e. at the lug-shaped portion 18. The conductor regions 28 and 29 should also abut with adequate sealing pressure. To this end, the surface is provided with two abutments 30 and 31. The abutment 30 exemplifies the case where a packaging container, at its second overlap joint 11, tapers off approximately 15° inwards (not shown in FIG. 1). The abutment 31 is disposed to ensure that the lower end of the inductor, i.e. the area around and below the conductor region 27 (seen in FIG. 6) cannot, under normal operational conditions, come into abutment against the packaging container "before" the remaining parts of the inductor and thereby run the risk of impeding the application of sufficient sealing pressure. It is of less importance to achieve sealing pressure in the lower region. In certain cases, it may even be an advantage if the pressure here is slightly less. With less pressure, which results in poorer contact, the heat generation will not be as great in the packaging material.

During sealing, the induction device is disposed in a per se known manner to cooperate with a counter abutment in order that a sealing pressure be capable of being achieved. The counter abutment is designed to abut against the inside of the packaging container and is designed to fit the inside contour of the packaging container. In the illustrated embodiment, the counter abutment is the top of an arm which is secured in a wheel. The packaging container is, in a per se known manner, disposed on the arm with the second packaging part, i.e. the plastic top, placed over the outer end of the arm. The wheel is, in a per se known manner, disposed to rotate each arm between different processing stations. The retrosealing according to the present invention may be the processing stage after the second overlap joint sealing 11 between the first and the second packaging parts and is carried out in its own processing station. Said station is provided with a sealing apparatus (not shown) including the previously described inductor devices. The sealing apparatus further includes a displacement device whose purpose is to displace the inductor device 14 from a starting position to a processing position in which its conductors will come into abutment against a packaging container and then return back to the starting position. The movement is preferably linear and is shown by the arrow 32 in FIG. 5. This movement may be realised by means of, for example, a hydraulic or pneumatic cylinder or a linear motor (not shown). In the processing position, the displacement device is disposed to exercise a pressure loading against the packaging container 1 in order to realise suitable sealing pressure in the area where the retrosealing is to be carried out.

The arm mounted in the wheel is preferably produced from aluminium. The advantage inherent in this will be described in greater detail hereinbelow.

On retrosealing according to the present invention, the inductor device 14 is displaced towards a packaging container 1 with the aid of the cylinder and is caused to exercise a pressure loading on the packaging container 1. The inductor device 14 is disposed to be positioned so that the lug-shaped portion 18 is applied over the intersection zone 12. The whole of the second leg 17, with the exception of a distance of the bridging area 29, will then be positioned against that portion of the first packaging part 2 whose edge section abuts against the second packaging part 3. In the described embodiment, this portion is the first portion 7 of the first packaging part 2, see FIG. 8. In the same Figure, it is shown that the first leg 16 abuts for the greater part against the second portion 8, but at least a part of the lower region 27 abuts against the first portion 7.

An inducing current is impressed in the induction device 14 and is led by the conductor 15 through the second leg 17 to the intersection zone 12 and back through the first leg 16. The inducing current is impressed during a pre-selected sealing time during which a heating current is induced in the aluminium foil in the packaging material which is heated up, the thermoplastic layer in the material also being heated up and melting sufficiently in order that, above all, the second overlap joint 11, but also the first overlap joint 6 be improved in the intersection zone 12. The sealing time is selected from the range of between 50 and 500 ms, and is preferably approx. 150 ms. After the sealing, a cooling time follows during which the sealing pressure is maintained.

FIG. 4 schematically illustrates the behaviour of the induced heating current in the aluminium foil in the first packaging part 2. For the sake of simplicity, the second packaging part 2 is shown "unsealed", i.e. as an exploded view. A great proportion of the current is led in the first portion 7 of the first packaging part 2, see lines 33 with directional arrows. The remainder of the current is conducted in the second portion 8, see corresponding lines 34. In order that an acceptable retrosealing take place between the first and second packaging parts 2 and 3 at least in the intersection zone 12, and in order to ensure that the outside of the packaging container is not damaged by the retrosealing, i.e. burnt, a sufficiently large proportion of the induced current should be conducted via the first portion 7 of the first packaging part 2. What is defined as sufficiently large proportion depends upon a number of parameters, including the type of packaging material, the sealing time and the current strength. The lower limit, in other words how much or little of the total induced current which is needed in order to attain a satisfactory seal without the risk of damage to the outside or inside of the packaging container is thus fluid and may be adapted in response to each individual case. On the other hand, the upper limit is easier to set. In an ideal case, 100% of the induced current is conducted in the first portion 7, but in purely practical terms this target is difficult to reach. In one embodiment, the plastic top is of 0.5 mm thick polypropylene. The packaging material in the first packaging part 2 includes an approximately 0.4 mm thick paperboard layer, an approximately 9 μm thick foil of aluminium, as well as a thermoplastic layer of polypropylene. The sealing time is approx. 150 ms and the high-frequency current supply device is at about 0.5 MHz. With these preconditions, it is desirable to have at least 50% of the current move in the first portion 7, preferably more than 60% and most preferably over 70%.

The current is adapted so that retrosealing takes place at least in the intersection zone between the two seals where the lug-shaped portion 18 of the conductor 15 in the inductor device 14 is placed. An increase of the current strength will result in also surrounding areas being heated to sealing temperature.

In those areas where there is a transition between one and two packaging material layers in the first packaging part 2, i.e. on both sides adjacent the first overlap joint 6, it may occasionally be desirable to provide extra sealing pressure in order to obviate any possible risk of channel formation occurring in the seals 6, 11. The inductor device may then be provided with projecting elements, so called beams, which extend a distance up out of the surface of the inductor device 14 which is to abut against the packaging container. In a per se known manner, the beams assist in further compressing the layers of packaging material The inductor device 14 according to the present invention is provided with three beams which are adapted to act in and at the intersection zone. These will be described in greater detail hereinbelow with reference to FIGS. 3 and 8. A first beam 35 is placed so that it is disposed to be applied flush with the second overlap joint 11 at that side of the first overlap joint 6 which displays the free incision surface of the edge section 5 of the second portion 8. The beam 35 is thereby disposed partly to overlap said edge section 5 and partly to be applied against the first portion 7. The second beam consists of a pair of beams 36. These lie a distance from one another within the second overlap joint 11 and are disposed to be applied over that side of the edge section 5 of the second portion 8 under which the outer edge of the edge section 4 is disposed. The beams 36 are thereby disposed to partly overlap a part of the edge section 5 and a part of the continuation in the form of the portion 8. The above described beams 35, 36 are made from copper and are produced in the conductor 15. Each beam has its longitudinal extent in a direction transversely of the longitudinal direction of the first overlap joint 6.

The above described embodiment should only be considered as one example. A person skilled in the art will readily perceive that the above-discussed embodiment may be modified and varied in numerous ways without departing from the inventive concept as herein disclosed.

Furthermore, the packaging parts which are to be sealed together need not be of the types described above, but may have other appearances and be composed of other materials. For example, the second packaging part may be something other than a top. It could, for example, be a ring or the like.

In addition, the conductor need not be of copper but could be of other material of low resistivity.

The layer of induction heatable material in the sheet need naturally not be aluminium, but could be manufactured from any other electrically conductive material.

It has been described that the retrosealing is put into effect by applying the inductor from the outside of the packaging container. Alternatively, the inductor device according to the present invention may instead be disposed to be provided inside the packaging container during the retrosealing. The inductor device and the sealing apparatus may then need to be modified.

The conductor has been described as displaying legs 16, 17 which are angled at an angle α. The legs 16, 17 may alternatively be angled stepwise. They may thereby, for example, consist of a number of conductor sections which are angled in relation to one another. Similarly, the legs 16, 17 may be formed wholly or partly as an arc. The term "curved" which is employed is intended to encompass all types of arcuate formations and angles.

What is claimed is:

1. A method of retrosealing an at least partly formed packaging container which comprises a tubular first packaging part of a sheet of thermoplastically coated packaging material comprised of at least one layer of an induction heatable material, the first packaging part having a first portion including an edge section and a second portion including an edge section, a first overlap joint being formed between said edge sections of the first and second portions, the packaging container also including a second packaging part which is adapted to be sealed to a first end of the first packaging part in a second overlap joint, the first and the second overlap joints intersecting one another, there being formed, at an intersection between the first and the second joints an intersection zone, and the method comprising retrosealing at least said intersection zone by disposing at least one induction heating device including at least one conductor at least against the intersection zone, inducing a current in the layer of induction heatable material and conducting a sufficiently large proportion of said induced current via the first portion of the first packaging part whose edge section abuts against the second packaging part in order that retrosealing take place between the first and second packaging parts at least in the intersection zone and for ensuring that an outside as well as an inside of the packaging container are not damaged by the retrosealing.

2. The method as claimed in claim 1, wherein the disposing of the induction heating device comprises disposing the greater part of the conductor against the first portion of the first packaging part whose edge section abuts against the second packaging part.

3. The method as claimed in claim 1, further comprising applying a counter abutment cooperating against the induction heating device and thereby realizing a pressure loading on the intersection zone during retrosealing.

4. The method as claimed in claim 3, wherein providing the induction heating device comprises disposing said conductor against the outside of the first packaging part and applying the counter abutment against the inside of at least the first packaging part.

5. An induction heating device for retrosealing, an at least partly formed packaging container, said packaging container including a tubular first packaging part of a sheet of thermoplastically coated packaging material including at least a layer of an induction heatable material, the first packaging part having a first portion including an edge section and a second portion including an edge section, a sealed first overlap joint being formed between said edge sections of the first and second portions, the packaging container also including a second packaging part which is sealed to a first end of the first packaging part in a second overlap joint, the first and second joints intersecting one another, there being formed, at the intersection between the first and the second joints, an intersection zone, said induction heating device including at least one conductor, and said induction heating device being adapted for abutment against at least the intersection zone and adapted to induce a current in the layer of induction heatable material, and said at least one conductor having an area of reduced effective width relative to an adjacent area of the conductor, the area of reduced effective width concentrating and increasing the current density to the first portion of the first packaging part whose edge section abuts against the second packaging part in order that retrosealing takes place between the first and second packaging parts at least in the intersection zone such that both an outside and an inside of the packaging container are not damaged by the retrosealing.

6. The induction heating device as claimed in claim 5, wherein the conductor is adapted to abut for the greater part against that portion of the first packaging part whose edge section abuts against the second packaging part.

7. The induction heating device as claimed in claim 5, wherein said conductor is adapted to abut against the outside of the first packaging part.

8. The induction heating device as claimed in claim 5, wherein the conductor includes a first and a second leg, each of said legs having a first and a second end, and wherein said legs, in their respective second ends, are interconnected via a lug-shaped portion.

9. The induction heating device as claimed in claim 8, wherein said legs extend a distance from one another and substantially parallel with one another.

10. The induction heating device as claimed in claim 8, wherein the first end of each leg is of substantially greater width than the width of the lug-shaped portion.

11. The induction heating device as claimed in claim 8, wherein each leg is curved and wherein each respective first end is adapted to at least initially extend in a direction substantially parallel with the first overlap joint.

12. The induction heating device as claimed in claim 10, wherein the width of each leg reduces in a direction from the first end towards the second end.

13. The induction heating device as claimed in claim 11, wherein said legs in a first conductor region are adapted to extend in a direction substantially parallel with the first overlap joint, and wherein the legs, at one end of the first conductor region, merge into a second conductor region where the legs deflect off in relation to the first conductor region, and wherein the second conductor region merges in one end into the lug-shaped portion.

14. The induction heating device as claimed in claim 13, wherein said legs in the second conductor region are angled at an angle in relation to the first conductor region.

15. The induction heating device as claimed in claim 13, wherein the width of said legs tapers off in the second conductor region in a direction towards the lug-shaped portion.

16. The induction heating device as claimed in claim 8, further including terminals to a high-frequency current supply device for conducting current through the conductor and the one leg being connected to one of the terminals and the other leg being connected to the other terminal so that a current which is impressed on the induction heating device is adapted to be conducted in one direction in the first leg and in an opposing direction in the second leg.

17. The induction heating device as claimed in claim 8, wherein there is disposed, between said legs, an inlay of powerfully magnetically permeable material.

18. The induction heating device as claimed in claim 8, wherein the lug-shaped portion is adapted to be disposed at least against the intersection zone, while the legs are adapted to be disposed for a greater part against the first portion of the first packaging part whose edge section abuts against the second packaging part.

19. The induction heating device as claimed in claim 5, wherein the conductor includes at least one element projecting out of a surface adapted to the packaging container, said element having its longitudinal extent in a direction substantially transversely of a longitudinal direction of the first overlap joint, and said element being disposed to give, in the intersection zone at a transition between one and two packaging material layers at the first overlap joint, extra pressure loading on the retrosealing.

20. A method of sealing to produce an at least partly formed packaging container comprising:
- positioning a sheet of thermoplastically coated packaging material comprised of at least one layer of an induction heatable material in a tubular form so that an edge section of a first portion of the first packaging part and an edge section of a second portion of the first packaging part overlap one another at a first overlap joint;
- positioning a second packaging part adapted to be sealed to an end portion of the first packaging part so that a portion of the second packaging part overlaps the end portion of the first packaging part in a second overlap joint which intersects the first overlap joint at an intersection zone;
- positioning at least one induction heating device including at least one conductor at least against the intersection zone;
- inducing a current in the layer of induction heatable material to conduct a sufficiently large proportion of the induced current via the first portion of the first packaging part to effect sealing between the first and second packaging parts at least in the intersection zone and to avoid damaging an outside and inside of the packaging container.

* * * * *